(12) United States Patent
Lecourtier

(10) Patent No.: US 9,193,434 B2
(45) Date of Patent: Nov. 24, 2015

(54) CONTROL BOX

(71) Applicant: MESSIER-BUGATTI-DOWTY, Velizy-Villacoublay (FR)

(72) Inventor: Gilbert Lecourtier, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 87 days.

(21) Appl. No.: 13/761,767

(22) Filed: Feb. 7, 2013

(65) Prior Publication Data

US 2013/0200212 A1 Aug. 8, 2013

(30) Foreign Application Priority Data

Feb. 8, 2012 (FR) ...................................... 12 51189

(51) Int. Cl.
| B64C 19/00 | (2006.01) |
| B64C 1/14 | (2006.01) |
| G05G 5/00 | (2006.01) |
| B64C 25/16 | (2006.01) |
| H01H 19/54 | (2006.01) |
| B64C 25/00 | (2006.01) |

(52) U.S. Cl.
CPC ............... *B64C 1/1446* (2013.01); *B64C 19/00* (2013.01); *B64C 25/00* (2013.01); *B64C 25/16* (2013.01); *G05G 5/005* (2013.01); *H01H 19/54* (2013.01)

(58) Field of Classification Search
CPC ........ B64C 25/26; B64C 25/24; B64C 25/30; E05B 57/00; E05B 17/20; E05B 15/12
USPC ................... 244/99.2, 99.3, 102 R; 74/483 K
See application file for complete search history.

(56) References Cited

U.S. PATENT DOCUMENTS

| 3,169,409 | A | * | 2/1965 | Babacz ........................ 74/471 R |
| 3,174,358 | A | * | 3/1965 | Wachta ........................... 74/548 |
| 3,831,406 | A | * | 8/1974 | Gebhard et al. .................. 70/1.5 |
| 8,267,351 | B2 | * | 9/2012 | Brookfield ................ 244/102 R |
| 8,528,441 | B2 | * | 9/2013 | Baic ............................. 74/501.6 |

FOREIGN PATENT DOCUMENTS

| DE | 2747152 A1 | 4/1979 |
| FR | 2875475 A1 | 3/2006 |
| WO | 2006/081664 A1 | 8/2006 |

OTHER PUBLICATIONS

Preliminary Search Report for FR 1251169, dated Oct. 24, 2012.
Written Opinion of the International Search Report for FR 1251189, dated Feb. 8, 2012.

* cited by examiner

*Primary Examiner* — Christopher P Ellis
*Assistant Examiner* — Christopher Hutchens
(74) *Attorney, Agent, or Firm* — Sughrue Mion, PLLC

(57) ABSTRACT

A control box for selectively delivering orders to receivers (8, 12). The control box comprises a shaft (14) mounted to turn about an axis of rotation (X), while being capable of sliding along the axis (X) between a rest position towards which it is urged by return means (24), and an active position. An order delivery apparatus (16, 11) co-operates with the shaft (14) to deliver orders as a function of the angular position of the shaft (14). A rotary drive (15) causes the shaft to turn. A safety actuator (23) causes the shaft to slide from the rest position in which anti-rotation structure (27, 28) prevents the shaft from turning to the active position in which the anti-rotation structure (27, 28) leave the shaft free to turn under drive from the rotary drive (15).

10 Claims, 3 Drawing Sheets

CONTROL BOX

The invention relates to a control box, in particular one that is suitable for use in operating an aircraft landing gear hatch on the ground.

BACKGROUND OF THE INVENTION

Most modern aircraft have retractable landing gear, wheel wells for receiving the landing gear while the aircraft is in flight, and hatches for closing the wheel wells. The hatches are opened and closed with the help of hatch operating actuators, e.g. hydraulic actuators.

When the hatch reaches the closed position, it is automatically locked in this position by hooking means, e.g. a hooking box having a hook hinged thereto that holds captive a roller fastened to the hatch. The hook is unhooked with the help of an actuator, usually a hydromechanical or an electromechanical actuator. Often the hooking box includes an emergency actuator capable of unlocking the hook in the event of it not being possible to use the main actuator.

In flight, the unhooking of the hook and the opening and closing of the hatch are controlled during sequences for extending and retracting the landing gear. It should be observed that the hatches are reclosed and hooked once the landing gear has been deployed.

When the aircraft is on the ground, it is necessary to be able to open the hatches, in particular in order to access equipment situated on the top portion of an undercarriage or in the wheel well. For this purpose, most aircraft include mechanical control means that are operable by personnel on the ground and making it possible to deactivate the hooking means in order to release the hatches.

These mechanical control means generally include a handle connected to the hooking box by a linkage, together with safety means for ensuring that the handle is not operated in untimely manner.

Those mechanical control means are particularly heavy, bulky, and therefore expensive for the aircraft manufacturer.

OBJECT OF THE INVENTION

An object of the invention is to provide a control box suitable in particular for being used in operating an aircraft landing gear hatch on the ground, which control box is of simplified design.

BRIEF SUMMARY OF THE INVENTION

In order to achieve this object, the invention provides a control box for selectively delivering orders to receivers, the control box comprising:
  a shaft mounted to turn about an axis of rotation, while being capable of sliding along said axis between a rest position towards which it is urged by return means, and an active position;
  order delivery means co-operating with the shaft to deliver orders as a function of the angular position of the shaft;
  rotary drive means for causing the shaft to turn; and
  safety actuation means for causing the shaft to slide from the rest position in which anti-rotation means prevent the shaft from turning to the active position in which the anti-rotation means leave the shaft free to turn under drive from the rotary drive means.

Thus, in order to deliver an order, an operator must act simultaneously on the safety actuation means and on the rotary drive means, thus making it possible to make control safe by avoiding any untimely generation of an order by the shaft accidentally being turned. In this situation, safety consists in preventing any such turning so long as the shaft has not been pushed in, which can thus be implemented in a manner that is particularly simple and light in weight.

The invention also provides a device for operating an aircraft landing gear hatch on the ground, the device comprising:
  means for operating the hatch;
  hooking means enabling the hatch to be locked when it reaches a closed position, the hooking means including at least one unlocking actuator arranged to act on the hooking means in order to deactivate them; and
  a control box as described above, the order delivery means of the control box optionally being connected to the operating means of the hatch and to the unlocking actuator in order to run the following sequences selectively:
    an opening sequence during which the unlocking actuator is actuated to deactivate the hooking means; and
    a closing sequence during which the operating means are actuated to reclose the hatch.

Thus, the hatch cannot be operated inadvertently by the action of an operator on the ground or by any other outside cause.

BRIEF DESCRIPTION OF THE DRAWINGS

The invention can be better understood in the light of the following description given with reference to the figures of the accompanying drawings, in which.

DETAILED DESCRIPTION OF THE INVENTION

The control box of the invention is described herein in an application to operating aircraft landing gear hatches on the ground, in which application it is particularly useful. Nevertheless, this application is not limiting.

Figure 1:
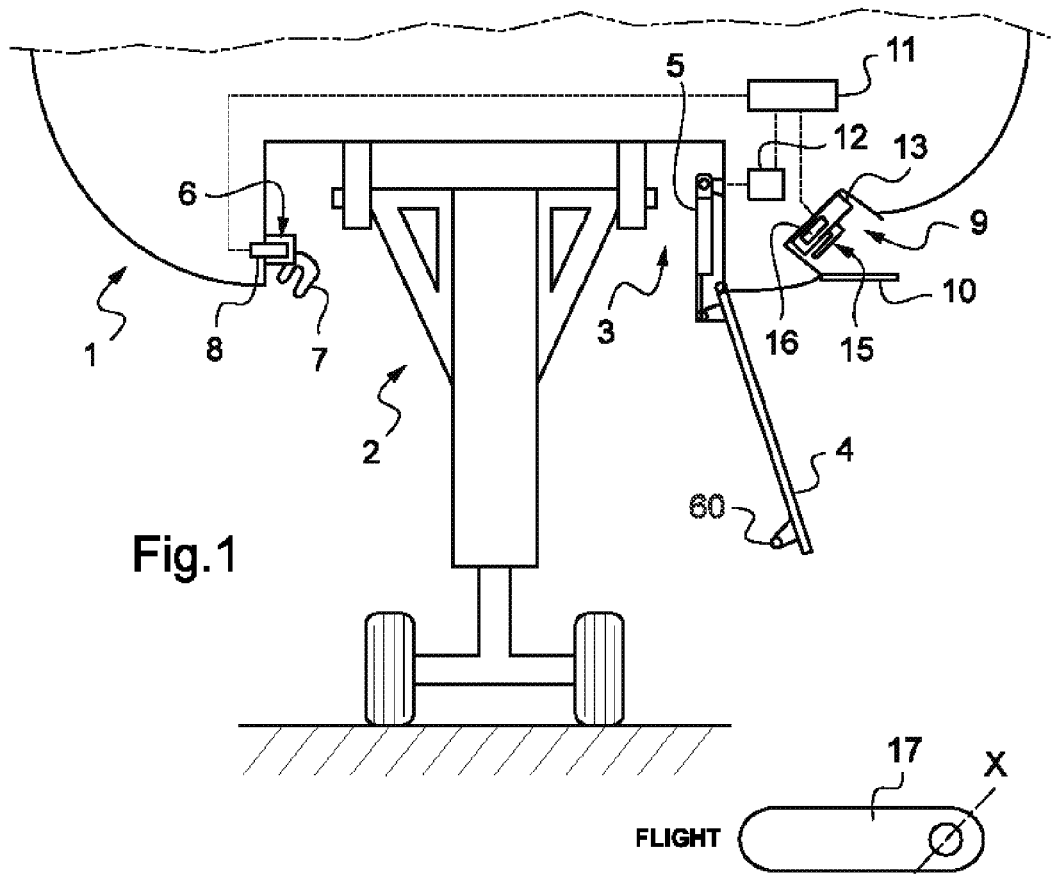
FIG. 1 is a diagrammatic face view of an aircraft wheel well with its hatch and its undercarriage in the deployed position, the aircraft being provided with a control box of the invention for controlling the operation of the hatch on the ground.

The aircraft 1 shown in FIG. 1 has an undercarriage 2 hinged to its structure to move between a deployed position as shown and a retracted position in which the undercarriage is received in a wheel well 3 that can be closed by a hatch 4. An actuator 5 coupled to the hatch 4 enables it to be operated. When the hatch 4 reaches a closed position, a hooking box 6 having a hook 7 serves to hook onto a roller 60 that is carried by the hatch 4. Unhooking of the hook 7 is controlled by an electromechanical actuator 8.

In order to control operation of the hatch 4 while on the ground, and in particular in order to unhook the hook 7, the aircraft has a control box 9 of the invention that is accessible by opening a door 10. The control box 9 in this example is electrically connected to an electrical unit 11 that is arranged to control an electrohydraulic solenoid valve 12 connected to the actuator of the hatch 5 and to control the electromechanical actuator 8 of the hooking box 6. The various functional connections between the above-mentioned pieces of equipment are shown diagrammatically in FIG. 1 by dashed lines.

Figure 2:
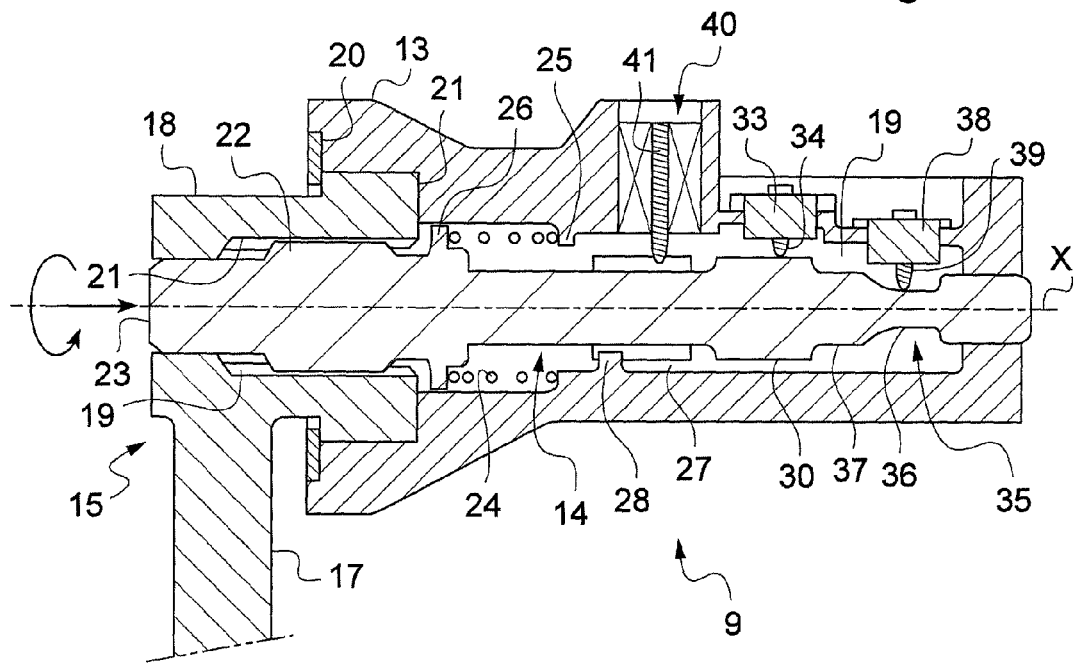
FIG. 2 is a section view of the control box of the invention on an axis of rotation of the handle, the shaft of the control box being in a rest position.
Figure 2B:
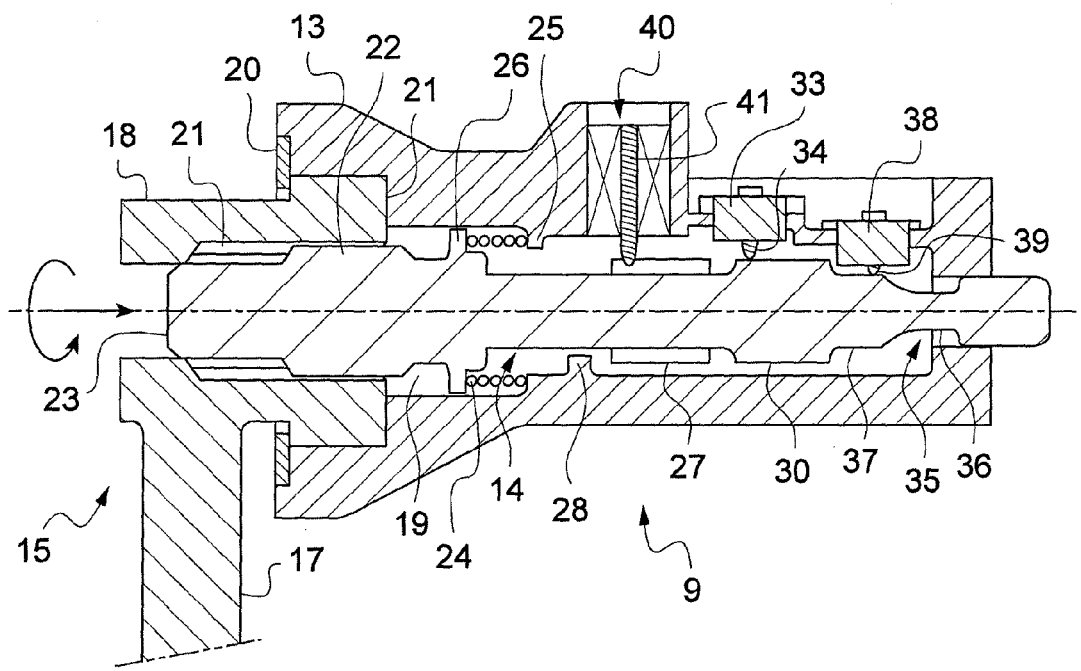
FIG. 2b is a section view similar to the view of FIG. 2, the shaft of the control box being in an active position.

The control box 9, shown in detail in FIGS. 2 and 2b, comprises:
- a body 13 fastened to the aircraft 1;
- a shaft 14 tunable about an axis X and also axially movable along the same axis X;
- a handle 15 for being turned about the axis X by an operator on the ground, and co-operating with the shaft 14 in order to turn it; and
- a processor 16 (visible in FIG. 1) enabling the angular position of the shaft 14 to be delivered to the electrical unit 11 in order to control an operation of the hatch 4 as a function of the angular position of the shaft 14.

The handle 15 has a grip portion 17 for being gripped by the operator that projects from a hollow hub 18 extending around the shaft 14. The hub 18 is engaged in a cavity 19 of the body 13 in order to guide it in turning about the axis X, and it is held in place by a stop washer 20. The hub 18 and the shaft 14 have complementary fluting 21, 22 enabling the shaft 14 to be turned by the handle 15 while also allowing the shaft 14 to move axially.

The shaft 14 is generally oblong in shape, and has an end 23 that extends to the center of the hub 18 of the handle 15 that is accessible to the operator, such that the end 23 forms an actuator member on which the operator can press in order to cause the shaft 14 to slide axially between a rest position shown in FIG. 2 and an active position shown in FIG. 2b. A spring 24 extends between a step 25 in the body and a collar 26 on the shaft 14 in order to urge the shaft 14 towards the rest position.

Grooves 27 in the shaft 14 co-operate with a finger 28 secured to the body 13 in such a manner that:
- in the rest position, the finger 28 is engaged in one of the grooves 27 so as to prevent the shaft 14 from turning; and
- in the active position, the finger 28 is disengaged from the grooves 27 so that the shaft 14 is free to turn under the effect of drive applied to the handle 15 by the operator.

Figure 3:
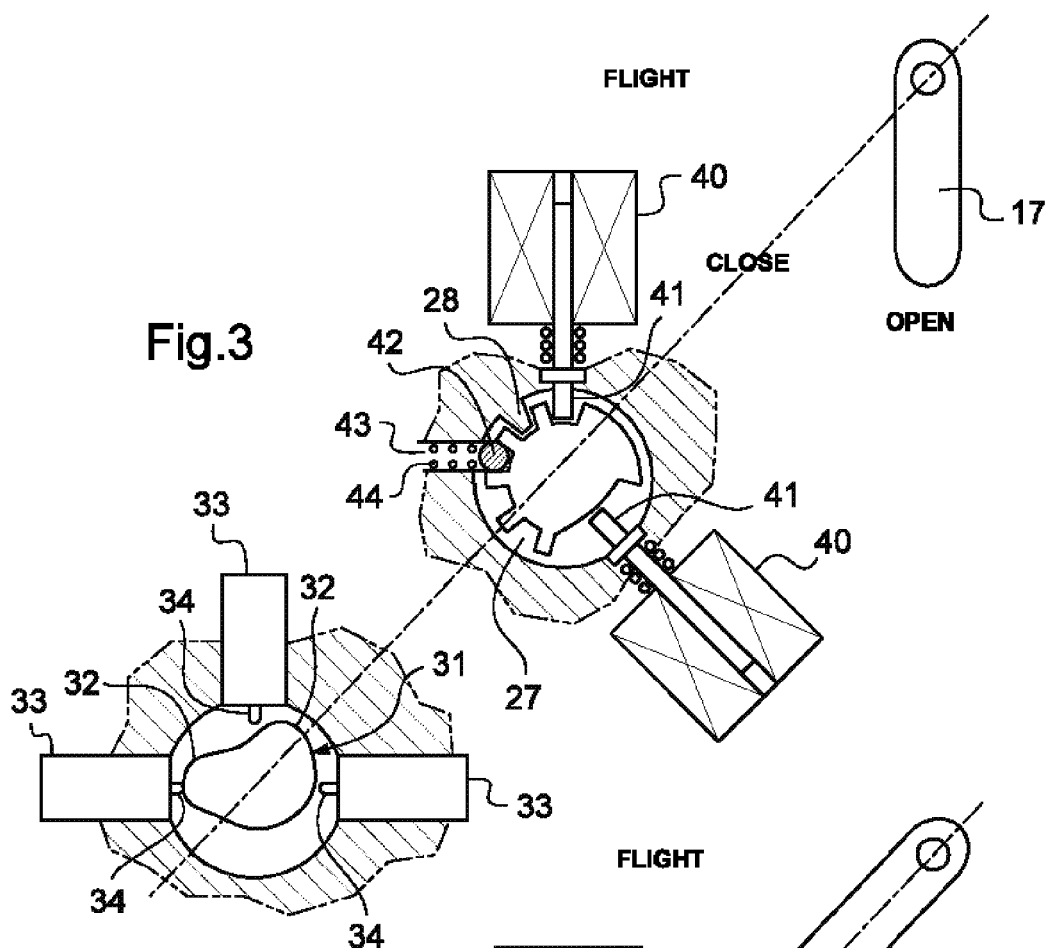

The shaft 14 also has an annular portion 30 serving to transform the angular position of the shaft 14, as controlled by the handle 15, into orders for the electrical unit 11 for controlling the solenoid valve 12 and the electromagnetic actuator 8. As can be seen in FIG. 3, this angular position 30 defines a cam 31 having two projections 32 adapted to interact with three contactors 33 situated in the body of the control box and including fingers 34 that extend into the cavity 19 in order to be pushed back if a projection 32 of the cam 31 comes into register with the associated contactor 33. Each of the different angular positions of the shaft (visible in FIGS. 3, 4, and 5, and referred to herein as "OPEN", "FLIGHT", and "CLOSE") thus corresponds to a respective particular combination of the states of the contactors, thereby enabling each angular position to be recognized. The contactors 33 are connected to the processor 16 so that it can act, as a function of the indications from the contactors, to determine the angular position of the shaft 14 and send said position to the electrical unit 11.

Thus, in order to operate the hatch 4, it is necessary for an operator to perform two actions simultaneously, consisting in pressing on the end 23 of the shaft 14 and in turning the handle 15, thus making it possible to avoid any unintended control. Finally, the shaft 14 has a partially recessed portion 35 comprising a recess 36 and a solid portion 37 that are adapted to interact with a fourth contactor 38 having its finger 39 pushed back when the solid portion 37 comes into register with the contactor 38. The contactor 38 thus detects whether the shaft 14 is in the active position or the rest position. The contactor 38 is connected to the processor 16 of the control box 9. When the contactor 38 detects an active position of the shaft 14 that causes the processor 16 to be powered together with the electrical unit 11, with its electricity consumption thus remaining zero so long as the hatch 4 is not being operated.

Depending on the angular position of the handle 15, the electrical unit 11 runs:
- an opening sequence (handle in the "OPEN" position) during which the electromechanical actuator 8 is activated in order or release the roller 10 of the hatch 4, the solenoid valve 12 is then activated so that both chambers of the hatch actuator 5 are connected, with the resulting force opening the hatch 4 after it has been released;
- a closing sequence (handle 15 in the "CLOSED" position) during which the solenoid valve 12 is actuated so that the hatch actuator 5 recloses the hatch 4, with the hatch 4 then being hooked automatically when it reaches the closed position; and
- an isolating sequence (handle in the "FLIGHT" position) that serves to ensure electrical isolation between the control box 9 and the remainder of the electricity circuit of the aircraft, thus making it possible to guarantee that no operation of the hatch 4 will be triggered in untimely manner.

In order to allow an operator on the ground to run a sequence, it is necessary for certain predetermined conditions to be satisfied, including:
- in order to run a closing sequence when the hatch 4 is open, it is necessary for both electrical and hydraulic energy to be available;
- in order to run an opening sequence, it is necessary for electrical power to be available; and
- it is not permitted to run an isolating sequence while the hatch 4 is open.

The body 13 of the control box 9 has two linear electrical solenoid actuators 40 interacting with the grooves 27 of the shaft 14. The movable portion of each actuator 40 is a rod 41 that slides in a radial direction relative to the shaft 14. These actuators 40 are controlled by the processor 16 of the control box 9.

Figure 5:
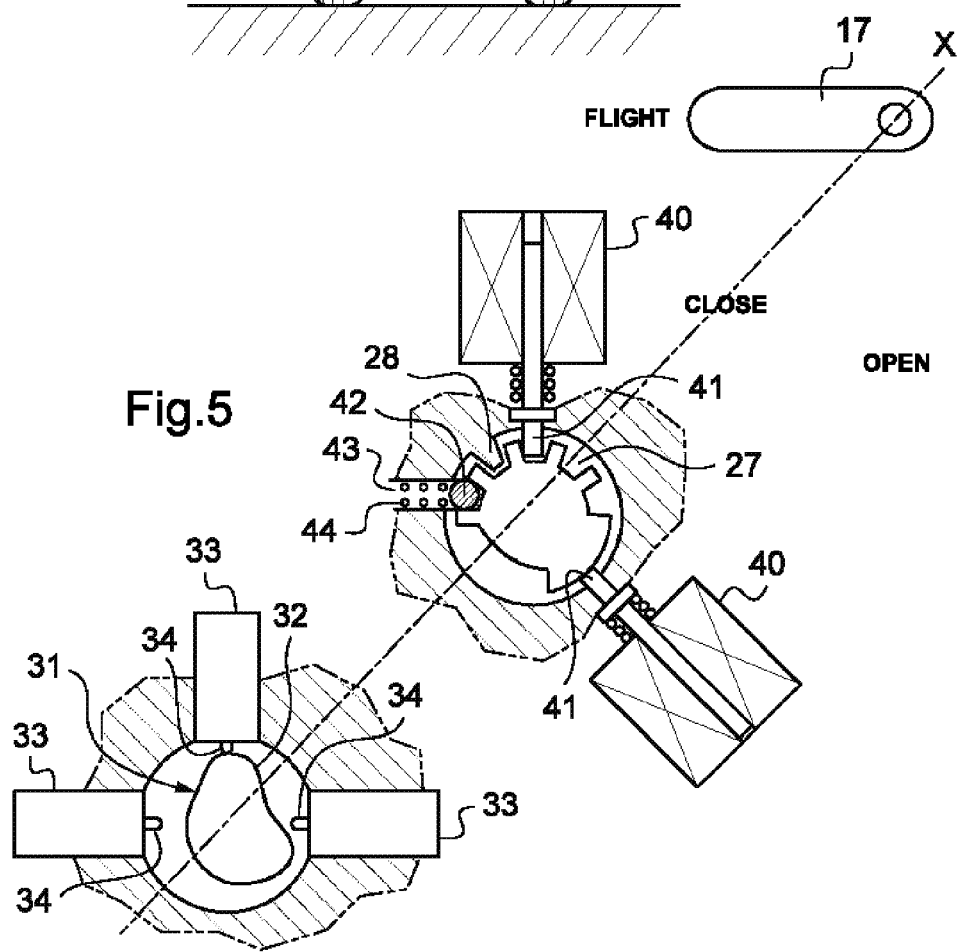
FIGS. 3, 4, and 5 are diagrams showing portions of the shaft of the control box of the invention in perspective, respectively in a first control state, in a second control state, and in a third control state.
Figure 4:
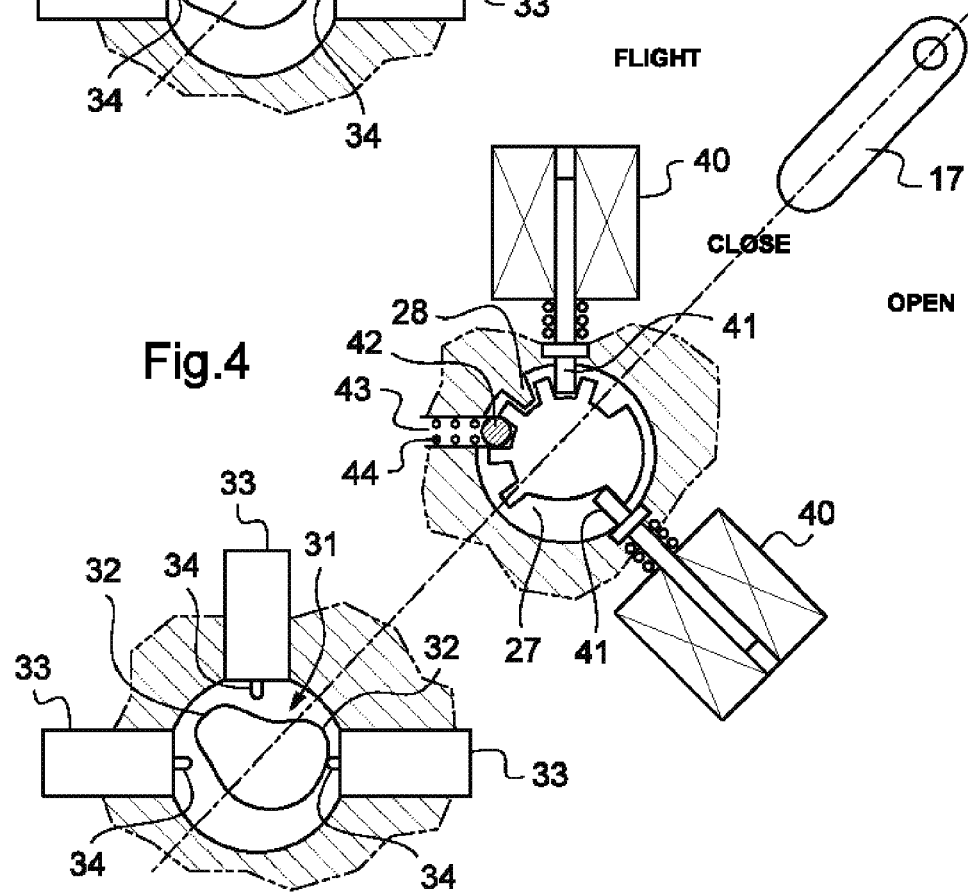

When the predetermined conditions are not satisfied, the rod 41 of the actuators 40 are engaged in the grooves 27 of the shaft 14 in the manners shown in FIGS. 3, 4, and 5 corresponding respectively to the "OPEN", "CLOSE", and "FLIGHT" positions. Thus, for each of the "OPEN", "CLOSE", and "FLIGHT" positions of the handle, the shaft presents at least one groove 27 in register with at least one actuator 40 in order to prevent the handle 15 from turning.

Unlike the position of the stationary finger 28, the positions of the rods 41 of the actuators 40 are such that they can be engaged in the grooves 27 regardless of the longitudinal position of the shaft 14: if the predetermined conditions are not satisfied, then the handle 15 is blocked even if the operator presses on the end 23 of the shaft 14.

An indexing ball 42 (visible in FIGS. 3, 4, and 5) is mounted to slide in a housing 43 provided in the body of the control box, in such a manner that the ball 42 is flush with the surface of the cavity 19 in order to co-operate with the shaft 14 via the grooves 27. The ball 42 is urged resiliently by a spring 44 to index turning of the shaft 14 for the purpose of aligning the grooves 27 in register with the rods 41 of the actuators 40 and for the purpose of providing the operator with physical feedback informing the operator whether the shaft is in a predefined OPEN, FLIGHT, or CLOSE position, or else is in an intermediate position.

The invention is not limited to the particular embodiment described above, but on the contrary covers any variant coming within the ambit of the invention as defined by the claims.

Although a particular number of angular position detectors are detected above and although these detectors are selected to be made using a particular technology based on contactors, and although a particular technology has been selected for the actuators, it is possible to provide for some other number and to use other technologies. For example, it is possible to use a Hall effect angular position sensor, with the magnet of the sensor occupying the shaft in such a manner as to interact electromagnetically with the detector regardless of the axial position of the shaft 14. Similarly, the general shape of the shaft and the relative positions of the elements in the cavity may be different, providing a portion of the shaft is suitable for co-operating with the angular position detector.

Although in this example the control box incorporates a processor for communicating with an external electrical unit, it is possible to provide for the processor and the external electrical unit to be incorporated in the control box or else in external equipment. It is also possible for the position of the shaft to be acquired and/or for orders to be transmitted in some other way, e.g. mechanically.

Although the control box described is for operating a landing gear hatch from the ground, it is possible to use the control box in any other application.

Finally, although the safety actuation means as described herein are constituted directly by the end of the shaft on which the operator presses, the safety actuation means could comprise a mechanical, electromechanical, or hydraulic actuator arranged to move the shaft axially under the control of the operator.

The invention claimed is:

1. A control box, operative by a user, for selectively delivering orders to receivers (8, 12), the control box comprising:
   a shaft (14) mounted to turn about an axis of rotation (X), while being capable of sliding along said axis (X) between a rest position towards which it is urged by return means (24), and an active position;
   order delivery means (16, 11) co-operating with the shaft (14) to deliver orders as a function of the angular position of the shaft (14);
   rotary drive means (15) for causing the shaft to turn; and
   safety actuation means (23) for causing the shaft to slide from the rest position in which anti-rotation means (27, 28) prevent the shaft from turning to the active position in which the anti-rotation means (27, 28) leave the shaft free to turn under drive from the rotary drive means (15),
   wherein, in order to deliver an order, the user must act simultaneously on the safety actuation means and on the rotary drive means, and
   wherein the anti-rotation means (27, 28) comprise longitudinal grooves (27) formed in a portion of the shaft (14) and co-operating with a stationary finger (28) of the control box so that the finger (28) is engaged in one of the grooves (27) when the shaft (14) is in the rest position and the finger (28) is disengaged from the grooves (27) when the shaft (14) is in the active position.

2. A control box, operative by a user, for selectively delivering orders to receivers (8, 12), the control box comprising:
   a shaft (14) mounted to turn about an axis of rotation (X), while being capable of sliding along said axis (X) between a rest position towards which it is urged by return means (24), and an active position;
   order delivery means (16, 11) co-operating with the shaft (14) to deliver orders as a function of the angular position of the shaft (14);
   rotary drive means (15) for causing the shaft to turn; and
   safety actuation means (23) for causing the shaft to slide from the rest position in which anti-rotation means (27, 28) prevent the shaft from turning to the active position in which the anti-rotation means (27, 28) leave the shaft free to turn under drive from the rotary drive means (15), and
   at least one retractable finger (41) adapted to penetrate selectively into one of the grooves (27) in order to prevent the shaft (14) from turning,
   wherein, in order to deliver an order, the user must act simultaneously on the safety actuation means and on the rotary drive means.

3. A control box according to claim 1, wherein the retractable finger (41) is a moving portion of an electromechanical solenoid actuator (40).

4. A control box according to claim 1, further including detector means (36, 37, 38) adapted to co-operate with the shaft (14) in order to detect whether the shaft (14) is in the rest position or in the active position.

5. A control box according to claim 4, wherein the detector means (36, 37, 38) cause the order delivery means (16, 11) to be powered when the shaft (14) is in the active position.

6. A control box according to claim 1, further including detector means (31, 33) adapted to co-operate with the shaft (14) in order to detect an angular position of the shaft (14).

7. A device for a user to operate an aircraft landing gear hatch on the ground, the device comprising:
   means (5, 12) for operating the hatch (4);
   hooking means (6, 7, 10) enabling the hatch (4) to be locked when it reaches a closed position, the hooking means (6, 7, 10) including at least one unlocking actuator (8) arranged to act on the hooking means (6, 7, 10) in order to deactivate them; and
   a control box (9) according to claim 1, the order delivery means (16) of the control box (9) optionally being connected to the operating means (5, 12) of the hatch and to the unlocking actuator (8) in order to run the following sequences selectively:
      an opening sequence during which the unlocking actuator (8) is actuated to deactivate the hooking means (6, 7, 10); and
      a closing sequence during which the operating means (5, 12) are actuated to reclose the hatch (4).

8. A device for operating a landing gear hatch on the ground according to claim 7, wherein the unlocking actuator (8) is an electromechanical actuator.

9. A device for a user to operate an aircraft landing gear hatch on the ground, the device comprising:
   means (5, 12) for operating the hatch (4);
   hooking means (6, 7, 10) enabling the hatch (4) to be locked when it reaches a closed position, the hooking means (6, 7, 10) including at least one unlocking actuator (8) arranged to act on the hooking means (6, 7, 10) in order to deactivate them; and
   a control box (9) according to claim 3, the order delivery means (16) of the control box (9) optionally being connected to the operating means (5, 12) of the hatch and to the unlocking actuator (8) in order to run the following sequences selectively:
      an opening sequence during which the unlocking actuator (8) is actuated to deactivate the hooking means (6, 7, 10); and
      a closing sequence during which the operating means (5, 12) are actuated to reclose the hatch (4).

10. A device for operating a landing gear hatch on the ground according to claim 9, wherein the unlocking actuator (8) is an electromechanical actuator.

* * * * *